United States Patent [19]
Zuk, Jr.

[11] Patent Number: 5,112,484
[45] Date of Patent: May 12, 1992

[54] FILTRATION APPARATUS

[75] Inventor: Peter Zuk, Jr., Harvard, Mass.

[73] Assignee: Zuk, Inc., Harvard, Mass.

[21] Appl. No.: 595,533

[22] Filed: Oct. 11, 1990

[51] Int. Cl.$^5$ .............................................. B01D 61/06
[52] U.S. Cl. ................... 210/247; 210/321.84; 210/359; 210/486
[58] Field of Search ............... 210/486, 359, 406, 476, 210/477, 479, 481, 321.6, 321.84, 247

[56] References Cited

U.S. PATENT DOCUMENTS

| | | | |
|---|---|---|---|
| 3,441,143 | 4/1969 | Kudlaty | 210/486 X |
| 3,469,369 | 9/1969 | Helmke | 40/406 X |
| 4,446,021 | 5/1984 | Aufderhaar et al. | 210/378 |
| 4,632,761 | 12/1986 | Bowers et al. | 210/650 |
| 4,639,316 | 1/1987 | Eldegheidy | 210/321.84 X |
| 4,755,300 | 7/1988 | Fischel et al. | 210/560 |
| 4,832,851 | 5/1989 | Bowers et al. | 210/650 |

OTHER PUBLICATIONS

Millipore publication entitled "Laboratory Ultrafiltration Products for Improved Biological Recovery", 1988.

*Primary Examiner*—Frank Spear
*Attorney, Agent, or Firm*—Heslin & Rothenberg

[57] ABSTRACT

A filtration device for separating filtrate and concentrate from a solution may contain a variable dead stop feature. The apparatus includes a housing with a means for collecting filtrate and a multiple sided filter unit insertable within the housing. The filter unit contains a semipermeable membrane thereon for separating filtrate from concentrate and a means for directing filtrate to a discharge within the housing. The apparatus also contains a means for preventing concentrate within the housing from escaping through the discharge opening of the housing.

19 Claims, 5 Drawing Sheets

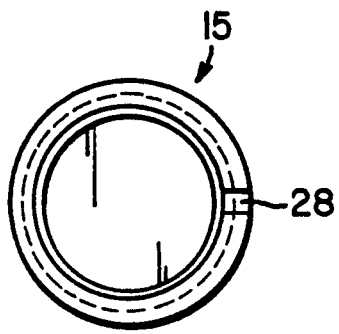
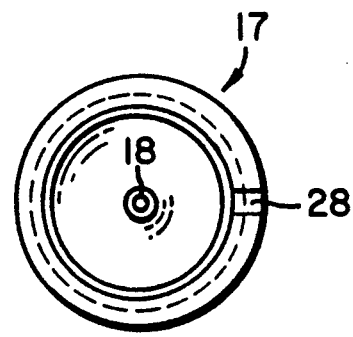
FIG. 3B  FIG. 4B
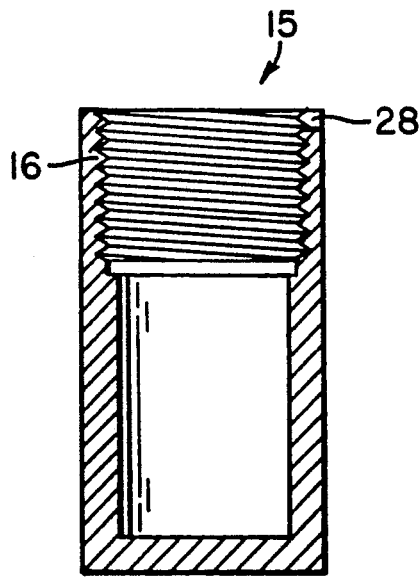
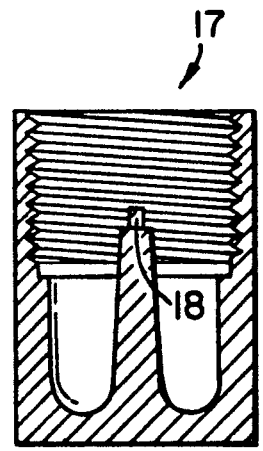
FIG. 3A  FIG. 4A

FILTRATION APPARATUS

BACKGROUND OF THE INVENTION

This invention relates to the filtration field, and more particularly, to an improved filtration apparatus for filtering and concentrating a solution.

It is well known that the filtration of fluids may be accomplished through the use of filtration devices which utilize microporous filters to filter and concentrate a macro-molecular solution. This technique has been utilized in centrifugal filtration apparatuses which rely on centrifugal forces to direct solutions towards a filter which separates liquid solutions into filtrate and concentrate.

There are certain drawbacks, however, associated with the conventional centrifugal filtration apparatus. Typically, such an apparatus contains a filter unit covering the bottom portion of a housing so that the centrifugal force draws the liquid solution towards the filter unit. One disadvantage with this type of system is that the filtration surface area is relatively small when compared to the volume of liquid solution within the housing. Therefore, filtration occurs at a relatively slow rate. Secondly, the filtration devices contain a semi-permeable membrane filter which is conducive to clogging because the heaviest and more dense molecules within the liquid solution are forced into the membrane filter.

Another problem with the conventional filtration devices is their propensity to filter a solution to dryness so that all of the solution will have been filtered. The apparatus continues to run despite all of the concentrate being filtered. Generally, filtration to dryness should be avoided because the recovery and biological feasibility of concentrate is significantly reduced.

Certain types of filtration devices, such as that disclosed in U.S. Pat. No. 4,632,761 to Bowers et al., are capable of preventing filtration to dryness and contain a dead stop feature which causes filtration to cease while there is concentrate remaining within the apparatus. This device, however, filters to dryness when spun at a 90° angle and therefore the dead stop feature will not work if the device is spun in a swinging bucket centrifuge. Also, in this type of filtration device, the amount of the concentrate remaining after dead stop is dependent upon the angle of rotation of the apparatus. The only means of varying the amount of concentrate remaining in the apparatus is to vary the angle at which the apparatus is rotated. This is impossible to do with fixed angle centrifuge rotors. Accordingly, this device is limited because it will filter to dryness when spun in a swinging bucket centrifuge and cease filtration at only one concentration level when spun in a fixed angle centrifuge.

It is therefore an object of the present invention to provide a filtration device which may be used in a swinging bucket centrifuge, as well as a fixed angle centrifuge, without filtering to dryness.

It is also an object of the present invention to provide a filtration device having a relatively high filtration membrane surface area thereby enabling filtration to occur at a higher rate.

It is also an object of the present invention to provide a filtration device which minimizes the clogging of the semi-permeable membrane thereby maximizing filter efficiency.

It is also an object of the present invention to provide a filtration apparatus which is self cleaning, and therefore, reusable.

It is a further object of the present invention to provide a filtration device which contains a variable dead stop feature so that the concentration remaining after filtration can be varied.

SUMMARY OF THE INVENTION

The foregoing problems of the prior art are solved, and the objects of the present invention are achieved, by use of a filtration apparatus constructed in accordance with the principles of the present invention.

In accordance with the present invention, the filtration apparatus for filtering and concentrating a solution includes a housing having a discharge opening therein; a multiple sided filter unit insertable within the housing; and a means for collecting the filtrate. The filter unit comprises a semi-permeable membrane on one or more sides of the filter unit for separating filtrate from concentrate and allowing filtrate to pass therethrough from within the housing, means for directing filtrate to the discharge opening of the housing, and means for preventing concentrate within the housing from escaping through the discharge opening.

The means for directing filtrate within the filter unit to the discharge opening of the housing may comprise ridges and the means for preventing concentrate within the housing from escaping through the discharge opening may comprise a seal. The filter unit may also contain a neck having a passage therethrough, the neck being insertable into the discharge opening of the housing for allowing filtrate to flow from the filter unit to the passage and into the discharge opening. The means for collecting the filtrate may include a filtrate cup. The housing may further comprise a threaded engagement means for supporting the filtrate cup having a corresponding threaded engagement means. The filter unit may contain a stop thereon and the housing may contain multiple keys located at different heights from the top portion of the housing. The stop may be inserted into different keys for adjusting the relative position of the filter unit within the housing thereby providing an adjustable dead stop feature.

BRIEF DESCRIPTION OF THE DRAWINGS

These and other objects, features and advantages of the invention will be evident from the following detailed description when read in conjunction with the accompanying drawings in which:

FIGS. 3 and 3A depict a cross sectional side view and a top view of a filtrate cup, respectively, in accordance with the embodiment depicted in FIG. 1;

FIGS. 4 and 4A depict a cross sectional side view and a top view of a concentrate cup, respectively, in accordance with the embodiment depicted in FIG. 1;

FIGS. 5 and 5A depict a partially cut away front view and a cross sectional view along lines A—A of FIG. 5, respectively, of a filter unit usable within the embodiment of the present invention depicted in FIG. 1;

DETAILED DESCRIPTION

Figure 1:
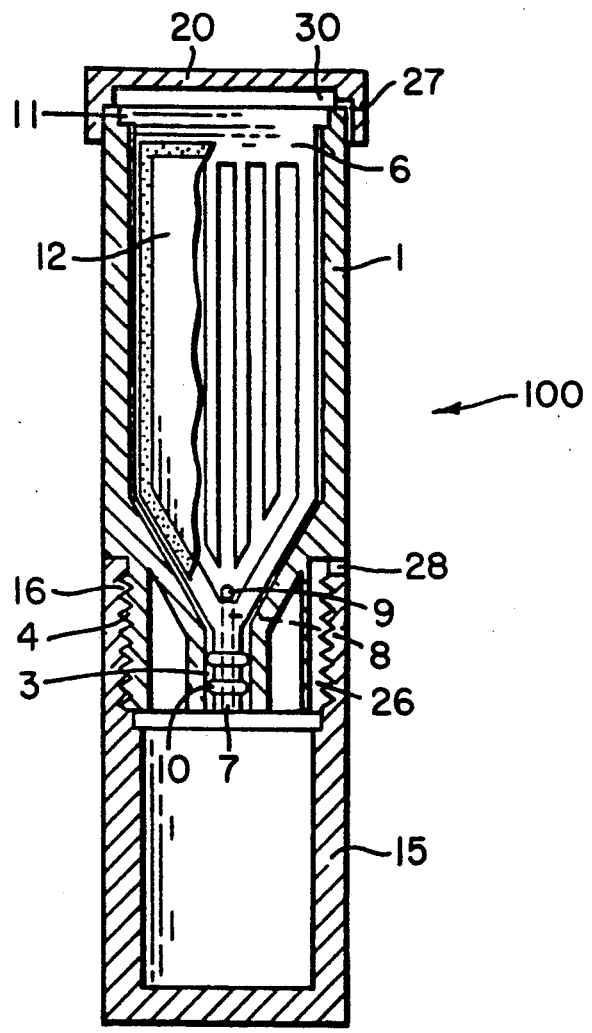
FIG. 1 is a partially cut away side cross sectional view which illustrates a fully assembled filtration apparatus, constructed in accordance with the principles of the present invention, usable within a centrifuge.

The improved filtration apparatus of the present invention may be embodied in a centrifugal filtration device 100 such as that shown in FIG. 1. Filtration device 100 includes the following major components: housing 1, multi-sided filter unit 6, filtrate cup 15 and cap 20. The structure and function of the components will now be described in detail.

Figure 2B:
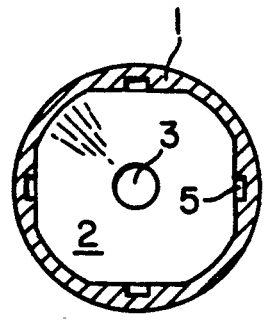
FIGS. 2 and 2A depict a cross sectional side view and a top view, respectively, of the housing, in accordance with the embodiment shown in FIG. 1.
Figure 2A:
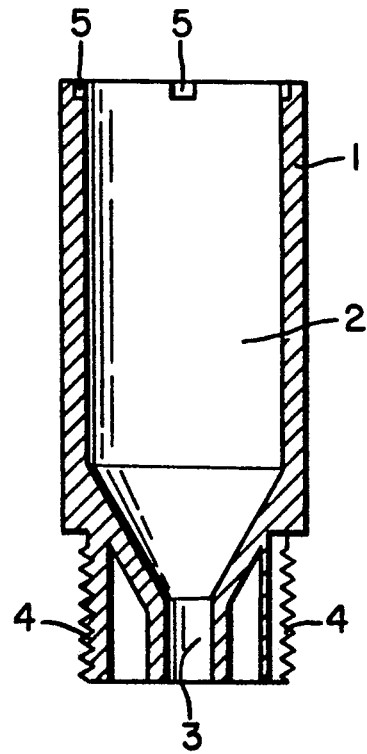

As shown most clearly in FIG. 2 and 2A, the filtration device includes a cylindrical housing 1 having a chamber 2 therein. At the lower portion of the housing, the chamber 2 tapers towards a discharge opening 3 located at the bottom of the housing. The discharge opening 3 is surrounded by a threaded member 4. At the top of the housing, a plurality of keys 5 are located. The keys 5 are spaced at different positions along the top perimeter of the housing 1 as shown in FIG. 2A.

Figures 5A, 5B:
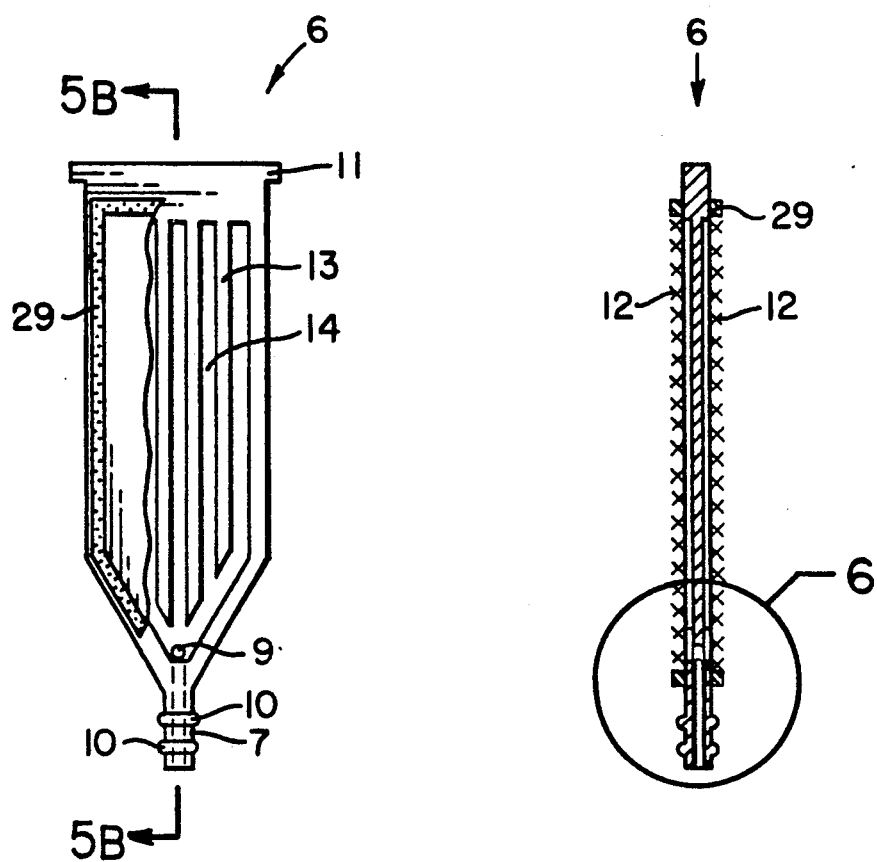
Figure 6:
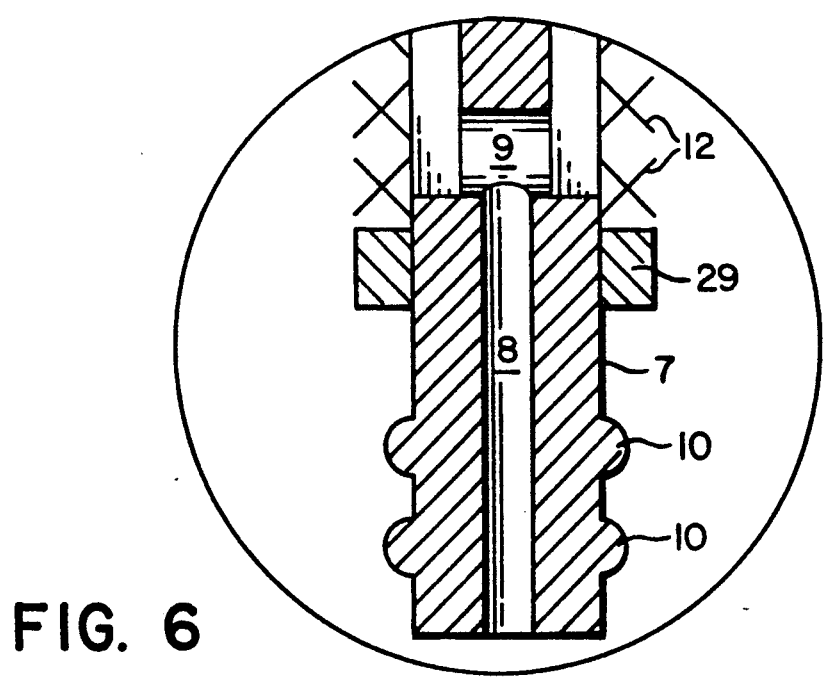
FIG. 6 depicts an exploded view of the neck of the filter unit.

A two-sided filter unit 6, as shown in FIGS. 5 and 5A, is insertable within chamber 2 of the housing 1. The filter unit 6 is flat shaped with both surfaces exposed. The lower portion of the filter unit is tapered to correspond with the tapered shape of the lower portion of the housing 1. The tapered portion of the filter unit 6 extends into a neck 7 which is cylindrical in shape. As shown in FIG. 6, the neck contains a longitudinal passage 8 running therethrough from the end of the neck to a point on the filter unit, at the lower tapered edge, intersecting a transverse passageway 9 extending between the opposite flat surfaces of unit 6. A sealing means, such as one or more rubber 0-rings 10, is located around the neck 7 of the filter unit 6. The sealing means may also be molded into neck 7 of filter unit 6. The molded in sealing means may take the form of molded in "O" rings on neck 7 of filter unit 6 or may simply be an interference fit between neck 7 of filter unit 6 and discharge opening 3 of housing 1.

As shown in FIG. 1, the filter unit 6 is insertable within the housing 1 so that the neck 7 of the filter unit 6 fits into the discharge opening 3 at the bottom of the housing. When this occurs, the 0-rings 10 on the neck 7 contact the inner wall of the discharge opening of the housing 3 to provide a liquid tight seal. The upper portion of the filter unit 6 contains one or more stops 11 located at the edges thereof. When the filter unit 6 is inserted into the housing 1, the stops 11 may be inserted into any of the keys 5 located at the upper perimeter of the housing. The keys 5 extend at different depths along the top of the housing 1 thereby enabling the filter unit to be placed at different heights within the housing 1. Each height corresponds to a different dead stop time or amount of concentrate left in the chamber 2 after filtration has ceased. Since the neck 7 of the filter unit 6 is elongate and insertable into the discharge opening 3 of the housing, variation of the filter unit height will not affect the sealing between the filter unit 6 and housing 1 by the O-rings 10. Therefore, concentrate will not escape from the housing even if the filter unit 6 is at different heights.

As shown in FIG. 5A, each side of the filter unit 6 contains a semi-permeable membrane 12 which separates filtrate from concentrated solution within the chamber 2. Each side of the filter unit 6 contains ridges 13 thereon which define grooves 14 (as shown in FIG. 5) for directing filtrate, which has passed through the membrane towards the neck 7 of the filter unit 6, to the discharge 3 of the housing. The grooves formed by the ridges run along the filter unit 6 surface towards the passageway 9 at the bottom tapered portion of the filter unit which leads to the passage 8 within the neck 7 located at the lower end of the housing 1. Filtrate which penetrates the membrane 12 is drawn towards the passageway 9 and into the passage 8 where it flows to the discharge opening 3 of the housing 1.

As shown in FIG. 5, the membrane may be heat sealed, ultrasonically sealed, glued or sealed by any other means to the outer perimeter of each side of the filter unit 6. The heat seal 29 effectively prevents concentrate within the housing from flowing into the passageway 9 and into the discharge opening 3.

A filtrate cup 15, shown in FIGS. 3 and 3A, contains threads 16 at the top portion thereof which are capable of engaging with the complimentary threads 4 located at the bottom portion of the housing 1. Using this means, the filtrate cup 15 can be secured to the housing 1 by screwing the filtrate cup 15 to the housing 1. In order to prevent pressure build up within the filtrate cup 15, the cup should be vented. Venting can be facilitated if the threads 4, 16 of the filtrate cup and housing do not form an air tight seal. Alternatively, the side of the filtrate cup may contain one or more direct vents 28 which intersects with one or more grooves 26, shown in FIG. 1, to allow air to pass from the filtrate cup.

As shown in FIG. 1, a cap 20 is placeable over the top portion of the housing 1 covering the chamber opening and keys 5 therein. As shown in FIG. 1, a gap 30 between the top of the cap 20 and the top of the housing 1 exists when the cap is placed on the housing. This allows the filter unit to fit within the housing and cap at various different heights. Each height is dictated by the placement of the filter unit stops 11 within the housing keys 5. The cap 20 is vented through vent 27 to allow atmospheric pressure to enter into the housing 1 when the device is spun within a centrifuge to prevent the creation of a vacuum therein.

The apparatus is assembled, as shown in FIG. 1, for filtration by inserting the filter unit 6 into the housing 1 so that the neck 7 is inserted within the discharge opening 3 and sealed therein. The filtrate cup 15 is then screwed on to the bottom of the housing via the threaded engagement means 4, 16. A macro-molecular type solution to be filtered and concentrated, may then be placed within the housing 1 in the chamber 2 where it contacts the membrane 12 of the filter unit 6 as well as the inner walls of the housing 1. The vented cap 20 is then placed at the top of the housing. The entire apparatus may be placed within a centrifuge rotor with the filtrate cup 15 directed outward such that the centrifugal force will direct the filtrate through the membrane 12 and into the filtrate cup 15. Filtration will cease when the amount of concentrate within the housing 1 reaches a level below the passageway 9 within the filter unit 6. This level can be adjusted by placing the stops 11 at the upper end of the filter unit within the different keys 5 at the top of the housing so that the height of the passageway 9 may be adjusted.

After filtration has ceased, i.e., dead stop has occurred, the apparatus may be removed from the centrifuge and the filtrate cup 15 unscrewed from the bottom of the housing 1. The filtrate will have collected within the filtrate cup 15. Since the apparatus has filtered to dead stop, concentrate will remain within the housing 1. However, the concentrate will not leak from the housing after the filtrate cup has been removed. A concentrate cup 17, shown in FIGS. 4 and 4A, may then be screwed onto the bottom of the housing, and the apparatus placed in a centrifuge and rotated so that the concentrate will collect in the concentrate cup.

The concentrate cup 17 has a protruding member 18 therein which extends from the bottom of the cup towards the top thereof. The protruding member 18 is positioned in the center of the cup such that when the concentrate cup 17 is screwed onto the bottom of the housing, the protruding member 18 contacts the neck 7 of the filter unit 6 and pushes the entire filter member 6 upwards relative to the housing 1. The seal between the neck 7, at the bottom portion of the filter unit 6, and discharge opening 3 of the housing 1 formed by the O-rings 10 will no longer be intact. This unseals the bottom portion of the housing 1 and allows the concentrate remaining within the housing to flow through the discharge opening and into the concentrate cup 17. The longitudinal passage 8 of filter unit 6 will be sealed by protruding member 18 thereby preventing filtrate from flowing through the discharge opening. The apparatus may then be spun in a centrifuge to force the concentrate to flow within the concentrate cup. Alternatively, to avoid respining the apparatus in a centrifuge, the concentrate remaining within the bottom portion of the housing 1 can be removed with a pipette.

The apparatus works on the principle that the centrifugal force acts parallel to the plane of the filter membrane 12 unlike the conventional filtration devices where the force acts normal to the plane of a filter membrane located at the bottom of the housing. The force, however, exerts a pressure throughout the solution within the housing 1 which is in turn exerted on to the membrane 12. This pressure causes filtration through the membrane 12 and into the filter unit 6 where the centrifugal force draws the filtrate towards the discharge opening and into the filtrate cup 15. Since the centrifugal force acts parallel to the membrane plane, the heaviest molecules within the solution and concentration are drawn away from the membrane towards the bottom of the housing where they will not clog the membrane filter 12. The force also draws any concentrate which may remain on the membrane surface 12 away from the surface towards the bottom of the filter unit thereby keeping the filter membrane 12 clean. These features enable the filter membrane to operate at optimal efficiency since the heaviest molecules and concentrate on the membrane are drawn to the lower portion of the housing.

The user may obtain higher concentration values by filling the unit with solution to be concentrated, performing the filtration in the centrifuge and then repeating the above procedure one or more times without removing the concentrate between filtrations.

Since the filter is reusable, the user may perform a filtration, remove the concentrate and then repeat this procedure one or more times. This allows the user to concentrate larger volumes than the maximum volume unit can concentrate in one step.

Figure 7:
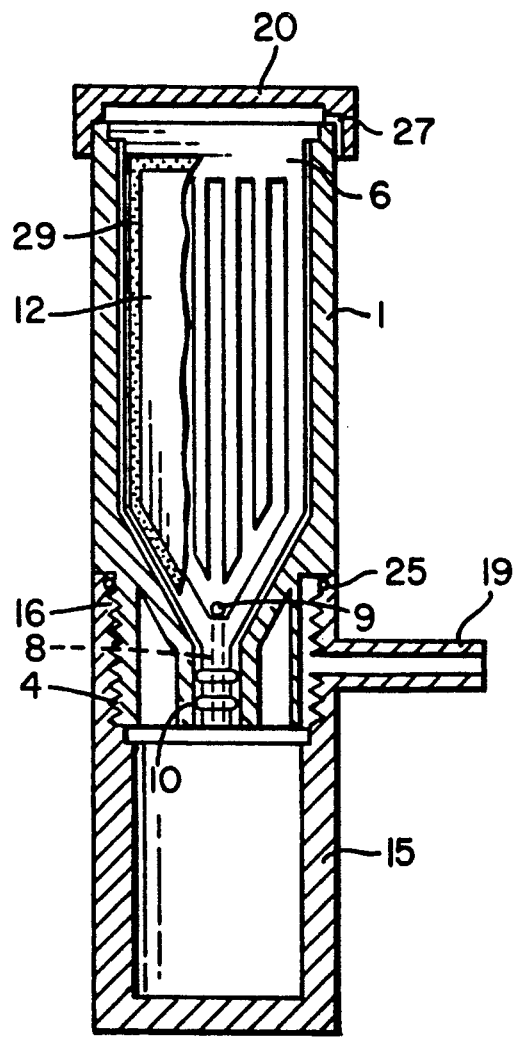
FIG. 7 depicts a side view of a fully assembled apparatus in accordance with the second embodiment of the present invention usable with a vacuum suction device.

In an alternate embodiment of the present invention, shown in FIG. 7, the apparatus may be used with a vacuum means in lieu of a centrifuge rotor. In this embodiment, the filtrate cup 15 contains a side arm 19 having a passage extending through the wall of the filtrate cup. When the filtrate cup is affixed to the bottom portion of the housing by screwing thereon, a vacuum hose (not shown) may be connected to the side arm 19 to create suction within the filtrate cup. In this particular embodiment, the filtrate cup 15 must be completely sealed to the housing 1. This may be accomplished by placing an O-ring seal 25 between the housing 1 and the upper part of the concentrate cup 15. However, other sealing means may be used.

The apparatus according to the alternative embodiment, is assembled by placing the filter unit 6 within the housing and the vented cap 20 at the top portion of the housing 1 while the filtrate cup 15 is affixed to the bottom portion of the housing. With a solution in the housing, the suction means can be activated to create a force which draws the filtrate through the bottom portion of the housing 1 into the filtrate cup 15. This embodiment contains the same dead stop feature as described in the first embodiment. After filtration has ceased, the concentrate may be removed with a pipette.

It will be evident that the invention may be embodied in a variety of manners other than those depicted herein. Any such embodiments are intended to be within the scope of the invention as defined by the claims.

What is claimed is:

1. A batch process filtration apparatus for separating filtrate and concentrate from a solution comprising:
   a housing having a discharge opening therein at its lower end, the housing being capable of containing a solution therein;
   a multiple sided filter unit insertable within the housing such that the sides of the unit are exposed therein, said filter unit comprising:
      a semipermeable membrane, capable of allowing filtrate therethrough, located on one or more sides of the filter unit for separating filtrate and concentrate,
      an opening on one or more sides of the filter unit for allowing filtrate to flow from one or more sides of the filter unit into a passage means, said passage means being at a lower portion of the filter unit for allowing filtrate to flow therethrough into the discharge opening,
   sealing means for preventing concentrate within said housing from escaping through the discharge opening wherein said opening is positioned above the sealing means during filtration to prevent the apparatus from filtering to dryness; and
   means for collecting filtrate.

2. The filtration apparatus of claim 1 wherein the filter unit further comprises ridges located on one or more sides thereof.

3. The filtration apparatus of claim 2 wherein the filter unit comprises a neck located at the lower portion thereof having said passage means therethrough, the neck being insertable into the discharge opening of the housing to allow filtrate to flow from the filter unit into the discharge opening.

4. The filtration apparatus of claim 3 wherein the means for preventing concentrate within said housing from escaping through the discharge opening comprises a seal around said 5. The filtration apparatus of claim 4 wherein the semipermeable membrane is located on more than one side of the filter unit, the filtration apparatus further comprising one or more stops on the filter unit, the housing containing a plurality of keys capable of receiving a stop, said keys being located at different positions along the height of the housing thereby allowing the filter unit to be placed at different relative positions within the housing.

6. The filtration apparatus of claim 4 further comprising a means for collecting the concentrate.

7. The filtration apparatus of claim 6 wherein the means for collecting the concentrate comprises a concentrate cup having a protruding member therein capable of being inserted within the discharge opening of the housing, whereby when said protruding member is inserted into the discharge opening the filter unit is displaced to allow concentrate from within the housing to flow with into said discharge opening and into the concentrate cup.

8. The filtration apparatus of claim 7 wherein the concentrate cup is threadedly engagable to the housing.

9. The filtration apparatus of claim 8 wherein the protruding member is positioned to be inserted within the discharge opening when the concentration cup is threadably engaged to the housing.

10. The filtration apparatus of claim 1 wherein the means for collecting filtrate comprises a filtrate cup.

11. The filtration apparatus of claim 10 wherein the housing further comprises threaded engagement means capable of operatively engaging complimentary threaded engagement means within the filtrate cup.

12. The filtration apparatus of claim 1 wherein the filter unit contains one or more stops and the housing contains a plurality of keys capable of receiving a stop, said keys being located at different positions along the height of said housing thereby allowing the filter unit to be placed at different relative positions within the housing.

13. The filtration apparatus of claim 1 further comprising a vented cap for covering the upper portion of the housing and allowing said apparatus to be spun in a centrifuge.

14. The filtration apparatus of claim 1 wherein the means for collecting filtrate is sealed to the housing and contains a means for connecting a vacuum suction within the means for collecting filtrate for forcing filtrate therein.

15. The filtration apparatus of claim 1 wherein the filter unit is two sided.

16. A batch process centrifugal filtration apparatus for separating filtrate and concentrate from a solution comprising:
- a housing having a discharge opening therein at its lower end, the housing being capable of containing a solution therein;
- a multiple sided filter unit insertable within the housing, said filter unit comprising:
  - a semipermeable membrane, capable of allowing filtrate therethrough, located on one or more sides of the filter unit for separating filtrate and concentrate, said filter unit configured to not allow a centrifugal force exerted upon a solution within the housing to act normal to the surface of the semipermeable membrane during filtration,
  - means for directing filtrate to the discharge opening of the housing;
- means for preventing concentrate within the housing from escaping through the discharge opening; and
- means for collecting filtrate.

17. A filter unit removably insertable within a filtration apparatus housing having a discharge opening therein, said filter unit comprising:
- a semipermeable membrane located on one or more sides of the filter unit, the semipermeable membrane being capable of allowing filtrate therethrough thereby separating filtrate and concentrate;
- a neck having a passage extending therethrough, the neck being located at the lower portion of the filter unit and being sized to be insertable within the discharge opening of the housing;
- an opening in one or more sides of the filter unit, said opening being in fluid flow relationship with the passage extending through the neck thereby allowing filtrate to flow therethrough into the discharge opening of the housing.

18. The filter unit insertable in a filtration apparatus for separating filtrate and concentrate from a solution according to claim 17 wherein the semi-permeable membrane is located on more than one side of the filter unit.

19. The filter unit insertable in a filtration apparatus for separating filtrate and concentrate from a solution according to claim 18 wherein the filter unit is two sided.

* * * * *

UNITED STATES PATENT AND TRADEMARK OFFICE
CERTIFICATE OF CORRECTION

PATENT NO. : 5,112,484

DATED : May 12, 1992

INVENTOR(S) : Peter Zuk, Jr.

It is certified that error appears in the above-identified patent and that said Letters Patent is hereby corrected as shown below:

```
Column 2, line 55, "2 and 2A" should be --2A and 2B--.
Column 2, line 58, "3 and 3A" should be --3A and 3B--.
Column 2, line 61, "4 and 4A" should be --4A and 4B--.
Column 2, line 64, "5 and 5A" should be --5A and 5B--.
Column 2, line 65, "A-A" should be --5B-5B--.
Column 3, line 15, "2 and 2A" should be --2A and 2B--.
Column 3, line 23, "2A" should be --2B--.
Column 3, line 24, "5 and 5A" should be --5A and 5B--.
Column 3, line 65, "5A" should be --5B--.
Column 4, line 12, "5" should be --5A--.
Column 4, line 18, "3 and 3A" should be --3A and 3B--.
Column 5, line 4, "4 and 4A" should be --4A and 4B--.
Column 5, line 61, after "volume" insert --the--.

Column 6, Claim 4, line 62, after "said" insert --neck.--.
```

Signed and Sealed this

Tenth Day of August, 1993

Attest:

MICHAEL K. KIRK

*Attesting Officer*  Acting Commissioner of Patents and Trademarks